(12) United States Patent
Turner et al.

(10) Patent No.: US 6,587,055 B1
(45) Date of Patent: Jul. 1, 2003

(54) SIMULTANEOUS TRIGGERING OF REMOTE UNITS

(75) Inventors: Paul George Turner, Bristol (GB); Steven Anthony Meade, Bristol (GB); Richard Michael Bennett, Salisbury (GB)

(73) Assignees: Fairfield Industries, Inc., Sugarland, TX (US); Wireless Systems International, Ltd. (GB)

( * ) Notice: Subject to any disclaimer, the term of this patent is extended or adjusted under 35 U.S.C. 154(b) by 0 days.

(21) Appl. No.: 09/530,680

(22) PCT Filed: Nov. 3, 1998

(86) PCT No.: PCT/GB98/03293
§ 371 (c)(1),
(2), (4) Date: Dec. 1, 2000

(87) PCT Pub. No.: WO99/23509
PCT Pub. Date: May 14, 1999

(30) Foreign Application Priority Data

Nov. 3, 1997 (GB) ............................................ 9723217

(51) Int. Cl.[7] .................................................. G01V 3/00
(52) U.S. Cl. ...................... 340/856.3; 367/14; 702/14; 181/107
(58) Field of Search .................... 340/856.3; 367/14, 367/21; 702/14; 181/107

(56) References Cited

U.S. PATENT DOCUMENTS

| | | | | | |
|---|---|---|---|---|---|
| 3,062,315 | A | * | 11/1962 | Herzog | 367/77 |
| 3,806,864 | A | * | 4/1974 | Broding et al. | 367/77 |
| 4,733,747 | A | * | 3/1988 | McCormack | 181/107 |
| 5,978,313 | A | * | 11/1999 | Longaker | 367/14 |

* cited by examiner

*Primary Examiner*—Timothy Edwards
(74) *Attorney, Agent, or Firm*—Jackson Walker L.L.P.; Mark A. Tidwell

(57) ABSTRACT

In a remote data acquisition system a control unit transmits a radio signal simultaneously to a plurality of remote units. Each remote unit receives the radio signal at different times dependent on various system delay factors. A compensating delay is added in each remote unit in order to trigger each remote unit for data acquisition at the same time.

34 Claims, 2 Drawing Sheets

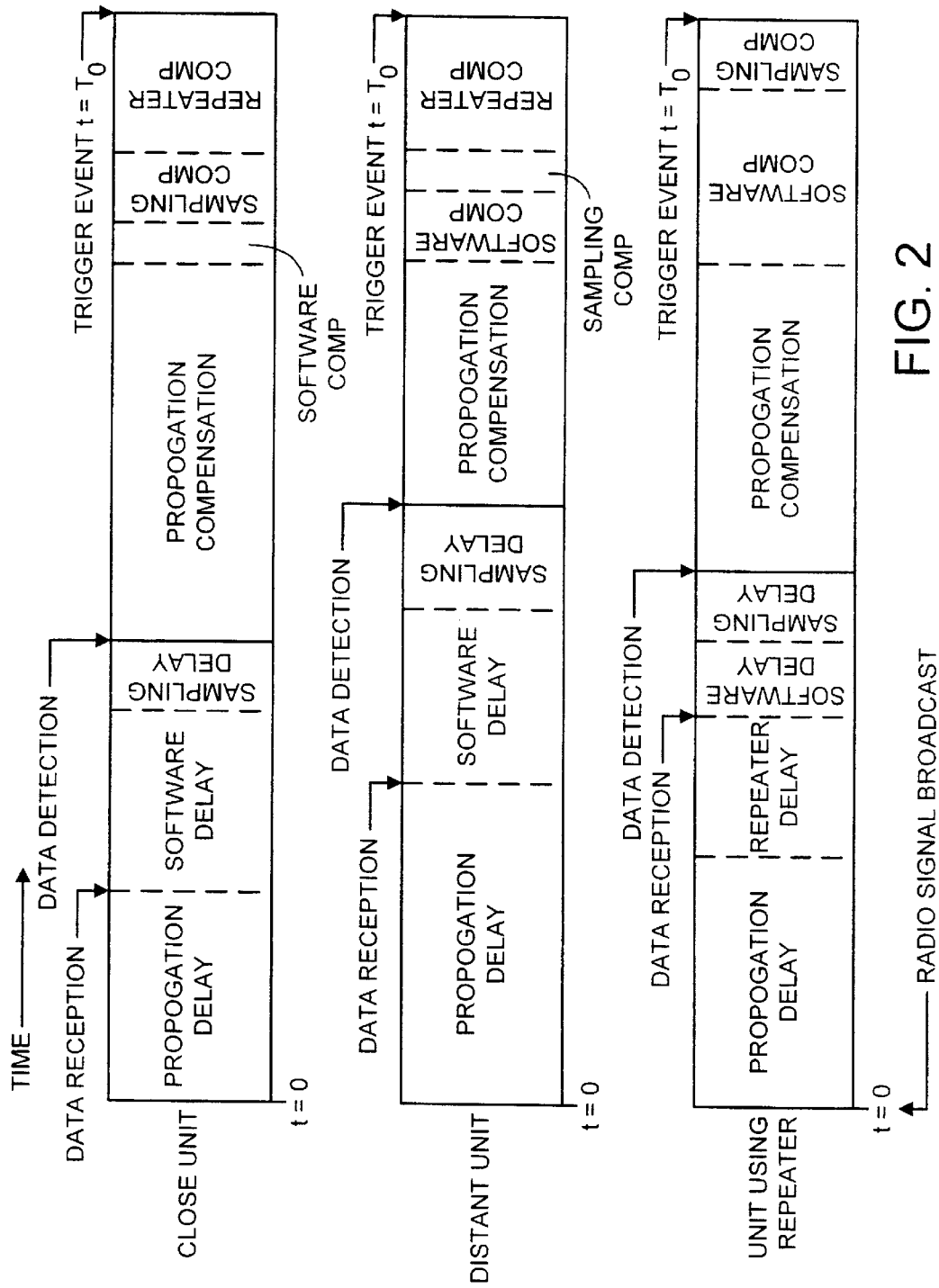

SIMULTANEOUS TRIGGERING OF REMOTE UNITS

Figure 1:
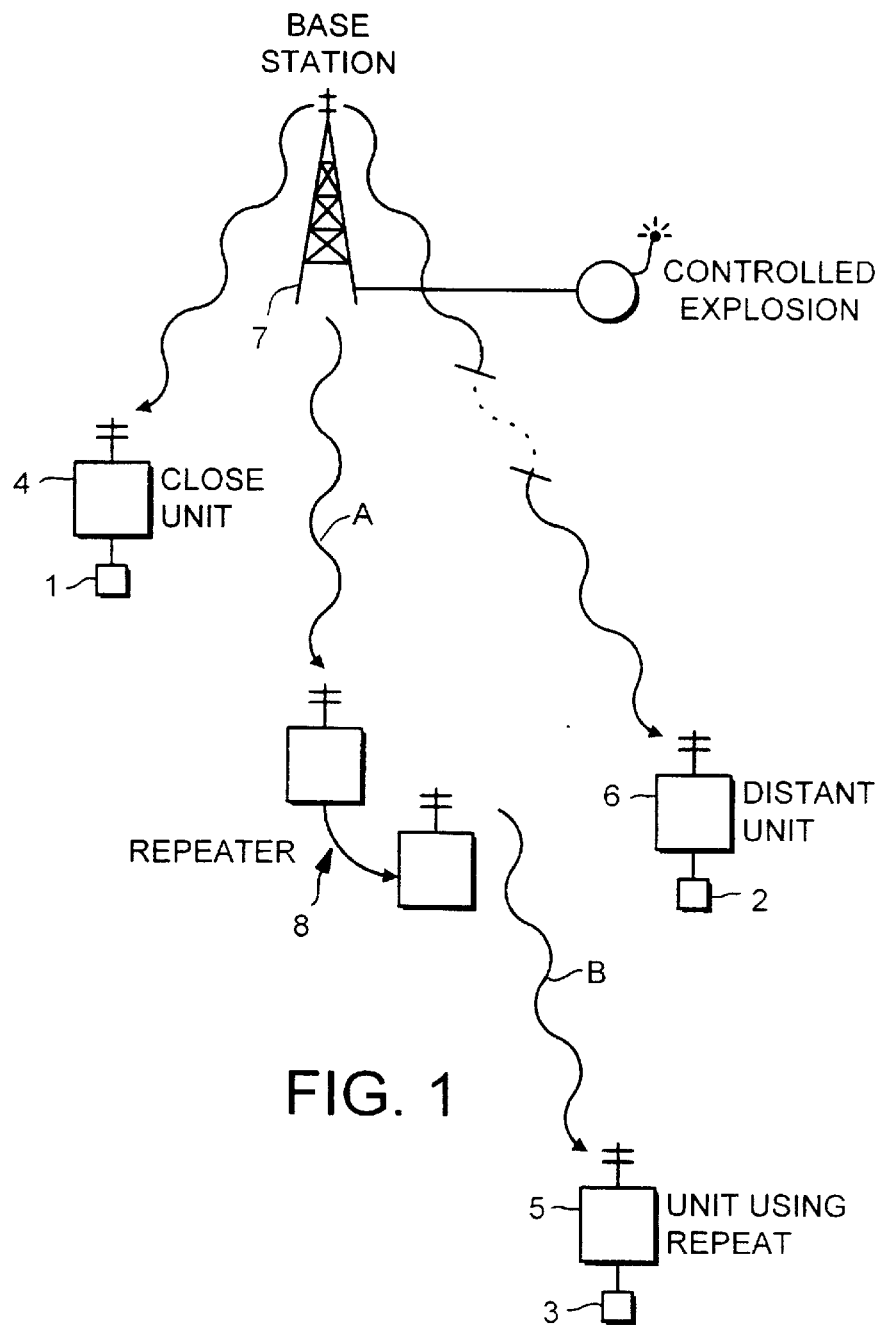

This invention relates to triggering of events simultaneously in a plurality of remote units, preferably by means of a radio signal sent from a control unit. The invention is particularly suitable for use in remote data acquisition systems, such as seismic data acquisition systems.

A seismic data acquisition system is disclosed in U.S. Pat. No. 4,733,744. Individual seismic source units of a surface array activated simultaneously for cumulative reinforcement may initiate seismic waves at slightly different times despite efforts at synchronisation. These variations are measured and used to compute an inverse operator which is applied to the summed uncorrected seismic recording so as to undo the distortion they produce.

A radio-link system for seismic exploration is disclosed in U.S. Pat. No. 3,062,315. The system comprises an array of geophones which transmit recordings of a seismic event using the same carrier frequency.

According to a first aspect of the present invention there is provided a method of triggering events simultaneously in a plurality of remote units, the method comprising:
  transmitting a radio signal from a control unit simultaneous to a plurality of remote units; detecting reception of the radio signal at each remote unit; determining for each remote unit a compensating delay period dependent on a system delay of the radio signal; triggering an event in each remote unit upon expiry of the compensation delay period following detecting reception of the radio signal.

According to a second aspect of the present invention there is provided a system comprising: a plurality of remote units; a control unit for transmitting a radio signal to the plurality of remote units for triggering events simultaneously in the remote units; wherein each remote unit comprises detecting means for detecting reception of a radio signal sent by the control unit, means for determining a compensating delay period dependent on a system delay of the radio signal, and means for triggering an event in the remote unit upon expiry of a determined compensation delay period following detecting reception of the radio signal.

A method and system in accordance with the invention has an advantage that by including a compensating delay period the remote units are able to trigger at the same time with a greater degree of accuracy. Therefore, relative timing discrepancies that occur between the remote units are compensated for.

Preferably, the control unit transmit radio signals by means of a base station, and the remote unit receives radio signals by means of a receiver.

Preferably, the remote units are data acquisition devices, each powered by an independent power supply, such as a battery unit.

The remote units may be spatially separated from one another, and may provide an array of sensors for a telemetry system. The sensors may be suitable for seismic data acquisition, and each remote unit may include a radio transmitter for transmitting the acquired data to a receiver in the control unit.

The event triggered in a remote unit may relate to a data acquisition process, comprising a single data acquisition, or possibly a series of data acquisitions.

Suitably, the radio signal transmitted by the control unit is sent in a digital data packet comprising a predetermined labelled data sequence preceding a data field. Detection in the remote unit may then involve correlating the received labelled data sequence with an equivalent sequence stored in the remote unit.

In a seismic telemetry system, the control unit may also initiate a seismic event such as a controlled explosion, preferably via a separate radio signal, or via a control line.

The system delay, may result from one of a number of delay factors or more commonly a combination of delay factors in the system. One such delay factor may result from the radio signal being transmitted to the remote unit via a repeater. Another delay factor may occur as a result of computational delays when detecting reception of the radio signal in the remote unit. A further delay factor may result from a sample timing error in the remote unit when detecting reception of the radio signal sent as a digital data packet. In this case, data detection may occur late, resulting in a delay of up to half the sample period, or may occur early, resulting in a negative delay, that is, anticipation of the data packet by up to half the sample period.

Preferably, the sum of the compensation delay period and the propagation delay is equal to a fixed value for all the remote units. Ideally, this fixed value is equal to or greater than the maximum possible system delay relevant to that particular system.

Further features and advantages of the invention will be apparent from the description below.

Embodiments of the invention will now be described, by way of example, with reference to the accompanying drawings, in which:

FIG. 1 is a schematic diagram showing a remote unit triggering system comprising a control unit and a spatial array of remote units; and FIG. 2 is a schematic diagram illustrating the system delays and compensation delay periods for three different remote units.

As shown in FIG. 1, a plurality of seismic sensors 1,2 and 3 are connected to respective radio transceivers 4,5, and 6. The transceiver and seismic sensor combination is referred to as a remote unit. The transceivers 4,5 and 6 include antennas and are arranged, in use, to transmit and receive data to and from a base station 7. Obstructions sometimes prevent direct communication between the transceivers and the base station. If this occurs, a repeater is provided in order to re-establish communication. Transceiver 5 is provided with such a repeater 8, as shown in FIG. 1.

From time to time the remote units are required to perform seismic data acquisitions. Synchronisation of the remote units is then required to enable the seismic data acquisitions to occur simultaneously. Synchronisation is brought about by simultaneous triggering of the data acquisition events in the remote units. The seismic data acquisitions are initiated in order to detect, for example, a seismic response of a medium to an explosion, or a disturbance provided by an impulse means.

When the remote units are required to be simultaneously triggered, the base station 7 broadcasts a radio signal simultaneously to all remote units. The radio signal is sent as a digital radio packet, comprising a predetermined labelled data sequence preceding a data field.

Referring to FIG. 2, this broadcast occurs at time t equals zero. The radio signal then propagates directly to the transceivers 4 and 6, and indirectly via the repeater 8 to the transceiver 5. Reception of the labelled data sequence from the radio signal is then detected in each remote unit, and following a compensation delay after detection of the data, an event is triggered simultaneously in each remote unit.

As shown in FIG. 2, the time at which data is detected is different for each remote unit, despite the radio data packet being sent to each remote unit at the same time. To recover the synchronicity within the system, the remote units compensate for the relative discrepancies in detecting the data packet, by means of compensating delay. The discrepancies between the remote units detecting the data packet are due to system delays which are specific to each remote unit. The system delays may be categorised depending on whether they occur before data reception or after data reception.

System delays which occur before data reception result from delays which occur over the radio channel and are either due to propagation delay or repeater delay.

System delays which occur after data reception, are the result of delays in detection of the received data, which comprise software processing delays and sample timing error delays.

Propagation Delays

Remote units are at different distances from the base station 7, as shown in FIG. 1. As the radio signal travels at a finite speed, the propagation time of the radio signal over the air from the base station to each remote unit will be proportional to the distance from the base station to the remote unit. This propagation time is known as the propagation delay, and for large distances such as 30 km, can be in the order of 0.1 ms. Each remote unit can determine the propagation delay based on knowledge of the remote unit to base station distance. This knowledge can be pre-stored in the remote unit, sent by the base station or determined using a global positioning system (GPS) receiver.

Repeater Delay

The remote unit 3,5 in FIG. 1 uses a repeater to indirectly receive a radio signal from the base station 7. The repeater 8 has an associated delay between receiving the radio signal labelled A from the base station, and retransmitting the radio signal labelled B on to the transceiver 5. This repeater delay is shown in FIG. 2 for the "unit using repeater". In practice, this delay can be in the order of 0.5 ms.

Software Processing Delay

In a remote unit the processor which detects when data is detected may be shared with other functions in the remote unit, and so the processor may at some instant not be operating on signals received by the transceiver. During this time, signals sampled by an analogue to digital converter are queued in sequence in a storage buffer. This can result in delays between receiving a data packet in the remote unit and detecting reception of the data packet by the processor. However, recovery of this delay may be achieved by determining the number of samples N in the queue at the instant when a data packet is detected. The processing delay is then given by the product of the number of samples N and the sample period of the analogue to digit converter. The software processing delay may be in the order of 0.5 ms depending on the speed of the processor.

Sample Timing Error Delay

The analogue to digital converter which processes signals received by the transceiver in a remote unit, operates at a fixed sampling rate. However, the arrival time of data sent by the base station is not always synchronised with the sampling instant of the analogue to digital converter. Therefore, there exists a sample timing error of +/−0.5 sample periods. This error is reflected as a delay or an anticipation in data detection process. To compensate for this delay or anticipation, the sample timing error may be recovered using known techniques, such as interpolation of data samples received by the remote units. Typical sample rates may be in the order of 5 kHz which equates to a delay of ±0.1 mS.

Data Compensation

To ensure that all remote units are able to trigger simultaneously, the system should be able to compensate for the sum of all maximum possible delays in the system.

Referring to FIG. 2, the sum of all maximum possible delays in the system should be equal or less than the trigger event time To.

If the remote units are all to be triggered at time To, then the total compensation delay calculated in each remote unit is defined by the following equation:

Total Compensation Delay=To−Σ system delays

FIG. 2 shows the individual compensations for each system delay. Once a remote unit details a relevant data packet sent from the base station 7, it determines the compensation delay period and waits until this period has expired, at which time an event is triggered, such as data acquisition.

It will be evident in view of the foregoing description, that various modifications may be made within the scope of the present invention.

What is claimed is:

1. A method of triggering events simultaneously in a plurality of remote units, the method comprising transmitting a radio signal from a control unit simultaneously to a plurality of remote units, detecting reception of the radio signal at each remote unit, determining for each remote unit a compensation delay period dependent on a system delay of the radio signal, and triggering an event in each remote unit upon expiry of the compensation delay period following detecting reception of the radio signal.

2. The method of claim 1, wherein the control unit transmits radio signals by means of a base station, and the remote unit receives radio signals by means of a radio receiver.

3. The method of claim 2, wherein the remote units are data acquisition devices, each powered by an independent power supply.

4. The method of claim 3, wherein the remote units are spatially separated from one another.

5. The method of claim 4, wherein the remote units provide an array of sensors for a telemetry system.

6. The method of claim 5, wherein one or more of the sensors are suitable for seismic data acquisition.

7. The method of claims 6, wherein each remote unit includes a radio transmitter for transmitting the acquired data to a receiver in the control unit.

8. The method of claim 7, wherein the event triggered in a remote unit relates to a data acquisition process, comprising a single data acquisition, or a series of data acquisitions.

9. The method of claim 8, wherein the radio signal transmitted by the control unit is sent in a digital data packet comprising a predetermined labeled data sequence preceding a data field.

10. The method of claim 9, wherein detection in the remote unit comprises correlating the received labeled data sequence with an equivalent sequence stored in the remote unit.

11. The method of claim 10, wherein the system delay results from a delay factor or a composition of delay factors.

12. The method of claim 11, wherein a delay factor results from the propagation time of the radio signal over the air to the remote unit.

13. The method of claim 12, wherein a delay factor results from the radio signal being transmitted to the remote unit via a repeater.

14. The method of claim 13, wherein a delay factor results from computational delays when detecting reception of the radio signal in the remote unit.

15. The method of claim 14, wherein a delay factor results from a sample timing error in the remote unit when detecting reception of the radio signal.

16. The method of claim 15, wherein the sum of the compensation delay period and the system delay is equal to a fixed value for all the remote units.

17. The method of claim 16, wherein the fixed value is equal to or greater than the maximum possible system delay for the system.

18. A telemetry system comprising:
   a plurality of remote units;
   a control unit for transmitting a radio signal to the plurality of remote units to trigger events simultaneously in the remote units; wherein each remote unit comprises:
      a detecting means for detecting reception of a radio signal sent by the control unit;
      a compensating means for determining a compensation delay period dependent on a system delay of the radio signal; and
      a triggering means for triggering an event in the remote unit upon expiry of a determined compensation delay period following detecting reception of the radio signal.

19. The system of claim 18, wherein the control unit is arranged to transmit radio signals by means of a base station, and the remote unit is arranged to receive radio signals by means of a radio receiver.

20. The system of claim 19, wherein the remote units are data acquisition devices, each powered by an independent power supply.

21. The system of claim 20, wherein the remote units are spatially separated from one another.

22. The system of claim 21, wherein the remote units provide an array of sensors for a telemetry system.

23. The system of claim 22, wherein one or more of the sensors are suitable for seismic data acquisition.

24. The system of claim 23, wherein each remote unit includes a radio transmitter for transmitting the acquired data to a receiver in the control unit.

25. The system of claim 24, wherein the event triggered in a remote unit relates to a data acquisition process, comprising a single data acquisition, or a series of data acquisitions.

26. The system of claims 25, wherein the radio signal transmitted by the control unit is sent in a digital data packet comprising a predetermined labeled data sequence preceding a data field.

27. The system of claim 26, wherein detection in the remote unit comprises correlating the received labeled data sequence with an equivalent sequence stored in the remote unit.

28. The system of claim 27, wherein the system delay results from a delay factor or a composition of delay factors.

29. The system of claim 28, wherein a delay factor results from the propagation time of the radio signal over the air to the remote unit.

30. The system of claim 29, wherein a delay factor results from the radio signal being transmitted to the remote unit via a repeater.

31. The system of claim 30, wherein a delay factor results from computational delays when detecting reception of the radio signal in the remote unit.

32. The system of claim 31, wherein a delay factor results from a sample timing error in the remote unit when detecting reception of the radio signal.

33. The system of claim 32, wherein the sum of the compensation delay period and the system delay is equal to a fixed value for all the remote units.

34. The system of claim 33, wherein the fixed value is equal to or greater than the maximum possible system delay for the system.

* * * * *